(12) United States Patent
Graif et al.

(10) Patent No.: US 10,725,949 B2
(45) Date of Patent: Jul. 28, 2020

(54) SLAVE-TO-SLAVE DIRECT COMMUNICATION

(71) Applicant: QUALCOMM Incorporated, San Diego, CA (US)

(72) Inventors: Sharon Graif, Zichron Yakov (IL); Lior Amarilio, Yokneam (IL); Mark Gakman, Kiryat Gat (IL)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 16/115,388

(22) Filed: Aug. 28, 2018

(65) Prior Publication Data
US 2020/0073836 A1 Mar. 5, 2020

(51) Int. Cl.
| | |
|---|---|
| *G06F 13/362* | (2006.01) |
| *G06F 13/42* | (2006.01) |
| *G06F 1/32* | (2019.01) |
| *G06F 1/10* | (2006.01) |
| *G06F 1/3296* | (2019.01) |
| *G06F 1/3293* | (2019.01) |
| *G06F 1/3287* | (2019.01) |

(52) U.S. Cl.
CPC .............. *G06F 13/362* (2013.01); *G06F 1/10* (2013.01); *G06F 1/3287* (2013.01); *G06F 1/3293* (2013.01); *G06F 1/3296* (2013.01); *G06F 13/4282* (2013.01); *G06F 13/4291* (2013.01)

(58) Field of Classification Search
None
See application file for complete search history.

(56) References Cited

U.S. PATENT DOCUMENTS

| | | | | |
|---|---|---|---|---|
| 10,140,242 | B2 * | 11/2018 | Mishra | ................ G06F 13/4282 |
| 10,496,562 | B1 * | 12/2019 | Graif | ..................... G06F 13/161 |
| 2010/0199007 | A1 | 8/2010 | Kapelner | |
| 2012/0131247 | A1 * | 5/2012 | Mok | ................... G06F 13/4291 |
| | | | | 710/110 |
| 2015/0100712 | A1 | 4/2015 | Sengoku | |

(Continued)

OTHER PUBLICATIONS

'Introduction to the MIPI I3C Standardized Sensor Interface' by MIPI Alliance, Aug. 2016. (Year: 2016).*

(Continued)

*Primary Examiner* — Steven G Snyder
(74) *Attorney, Agent, or Firm* — Qualcomm Incorporated

(57) ABSTRACT

Methods and apparatuses for operating a direct communication over a serial communication bus are provided. An apparatus includes a master having a host controller. The host controller is configured to communicate with a first slave and with a second slave via a serial communication bus using at least one master-slave address, in accordance with a serial communication protocol. The host controller includes a master-slave module configured to operate communication with the first slave and with the second slave via the serial communication bus in accordance with the serial communication protocol and be in a low-power mode while the first slave and the second slave are in a direct communication. The host controller includes an always-on module configured to, while the master-slave module is in the low-power mode, clock the serial communication bus for the direct communication.

17 Claims, 7 Drawing Sheets

(56) References Cited

U.S. PATENT DOCUMENTS

| | | | | |
|---|---|---|---|---|
| 2015/0100713 | A1* | 4/2015 | Sengoku | G06F 13/4291 |
| | | | | 710/110 |
| 2017/0039162 | A1* | 2/2017 | Mishra | G06F 13/385 |
| 2017/0075852 | A1* | 3/2017 | Mishra | G06F 13/4282 |
| 2017/0097912 | A1* | 4/2017 | Takahashi | G06F 13/4291 |
| 2017/0222829 | A1 | 8/2017 | Kessler et al. | |
| 2018/0046595 | A1* | 2/2018 | Pitigoi-Aron | H02K 9/02 |
| 2018/0052791 | A1* | 2/2018 | Srivastava | G06F 1/3253 |
| 2018/0181507 | A1* | 6/2018 | Foust | G06F 13/24 |
| 2018/0329857 | A1* | 11/2018 | Mishra | G06F 13/4282 |
| 2018/0348845 | A1* | 12/2018 | Wang | G06F 1/3253 |
| 2018/0357199 | A1* | 12/2018 | Mishra | G06F 13/4282 |
| 2019/0018818 | A1* | 1/2019 | Graif | G06F 13/26 |
| 2019/0108149 | A1* | 4/2019 | Graif | G06F 13/24 |
| 2019/0121765 | A1* | 4/2019 | Srivastava | H04L 47/30 |
| 2019/0317911 | A1* | 10/2019 | Chun | G06F 1/3234 |

OTHER PUBLICATIONS

Mipi Alliance: Draft Specification for I3C, Improved Inter Integrated Circuit, Version 1.01 Release 03, Jan. 10, 2018, 219 pages.
Mipi Alliance: Draft Specification for I3C, Improved Inter Integrated Circuit, Version 0.7 Revision 17, Jun. 22, 2016, 186 pages.
Mipi Alliance: "Draft Specification for I3C," Improved Inter Integrated Circuit, Version 1.1, Release 05, Jul. 29, 2018, 346 pages.
Amon Y., et al., "Serial Peripheral Mode in MIPI Improved Inter-integrated Circuit (I3C) /Specification for I3CSM, Improved Inter Integrated Circuit", Specification for I3CSM, Improved Inter Integrated Circuit, Dec. 31, 2016, XP055504459, pp. 1-197, US, Retrieved from the Internet: URL:https://cdn2.hubspot.net/hubfs/2384176/public-specifications/mipi_I3C_specification_v1-0_public_edition.pdf?utm_campaign=I3C%20v1.0%20Download&utm_medium=email&_hsenc=p2ANqtz-9ktG3MvcF8KaQXcGuMpHRJ_rtj45SfOVZmDilAKEpZwEI4CxCa.
International Search Report and Written Opinion—PCT/US2019/043429—ISA/EPO—dated Dec. 12, 2019.

\* cited by examiner

SLAVE-TO-SLAVE DIRECT COMMUNICATION

BACKGROUND

Field

The present disclosure relates generally to an interface between processors (e.g., master devices) and peripheral devices (e.g., slave devices) and, more particularly, to slave-to-slave direct communication via a serial communication bus.

Background

A computing device (e.g., a laptop, a mobile phone, etc.) may perform various functions, such as telephony, wireless data access, and camera/video function, etc. Such computing device may include a variety of components including circuit boards, integrated circuit (IC) devices and/or System-on-Chip (SoC) devices. The components may include processing circuits, user interface components, storage and other peripheral components that communicate through a serial communication bus. In one example, the serial communication bus may be operated in accordance with Inter-Integrated Circuit protocols, which may also be referred to as I2C protocols or $I^2C$ protocols. The I2C protocols are operable on a serial, single-ended bus used for connecting low-speed peripherals to a processor. In some examples, a serial communication bus may employ a multi-master protocol in which one or more devices can serve as a master and a slave for different messages transmitted on the serial communication bus. Data may be serialized and transmitted in a data signal carried on a Serial Data (SDA) line (SDA), in accordance with timing provided in a clock signal carried on a Serial Clock (SCL) Line.

In some examples, the serial communication bus may be operated in accordance with I3C protocols defined by the Mobile Industry Processor Interface (MIPI) Alliance. The I3C protocol can increase available bandwidth on the serial communication bus through higher transmitter clock rates, by encoding data in symbols defining signaling state of two or more wires, and/or through other encoding techniques including double data rate transmissions (where data is clocked using rising and falling edges of a transmitted clock signal). Certain aspects of the I3C protocol are derived from corresponding aspects of the I2C protocol, and the I2C and I3C protocols can coexist on the same serial communication bus (e.g., on the SDA line and the SCL line).

In the past, some have tried to specify a protocol for peer-to-peer communication (direct communication between slave devices; also known as "device to device" or D2D). Some of these efforts proved inefficient, and an improved direct communication scheme between the slave devices is needed.

SUMMARY

This summary identifies features of some example aspects and is not an exclusive or exhaustive description of the disclosed subject matter. Additional features and aspects are described and will become apparent to persons skilled in the art upon reading the following detailed description and viewing the drawings that form a part thereof.

An apparatus in accordance with at least one embodiment includes a master having a host controller. The host controller is configured to communicate with a first slave and with a second slave via a serial communication bus using at least one master-slave address, in accordance with a serial communication protocol. The host controller is configured to detect an interrupt request in accordance with the serial communication protocol and a request for a direct communication between the first slave and the second slave, on the serial communication bus. The request for the direct communication is different from the at least one master-slave address.

Another apparatus in accordance with at least one embodiment includes a master having a host controller. The host controller is configured to communicate with a first slave and with a second slave via a serial communication bus using at least one master-slave address, in accordance with a serial communication protocol. The host controller includes a master-slave module configured to operate communication with the first slave and with the second slave via the serial communication bus in accordance with the serial communication protocol and be in a low-power mode while the first slave and the second slave are in a direct communication. The host controller includes an always-on module configured to, while the master-slave module is in the low-power mode, clock the serial communication bus for the direct communication.

Another apparatus in accordance with at least one embodiment includes a first slave configured to communicate with a master via a serial communication bus using at least one master-slave address, in accordance with a serial communication protocol and to be in a direct communication with a second slave via the serial communication bus. The first slave is configured to provide, to the master, an interrupt request in accordance with the serial communication protocol and a request for the direct communication between the first slave and the second slave, on the serial communication bus. The request for the direct communication is different from the at least one master-slave address.

Another apparatus in accordance with at least one embodiment include a master having a host controller. The host controller is configured to communicate with a first slave and with a second slave via a serial communication, in accordance with a serial communication protocol. The host controller includes a master-slave module configured to communicate with the first slave and with the second slave via the serial communication bus in accordance with the serial communication protocol and be in a low-power mode while the first slave and the second slave are in a direct communication. The host controller further includes an always-on module configured to, while the master-slave module is in the low-power mode, clock the serial communication bus for the direct communication.

A method for operating direct communication over a serial communication bus, in accordance with at least one embodiment, includes communicating, by a first slave, with a master via a serial communication bus using at least one master-slave address, in accordance with a serial communication protocol. The method further includes communicating directly, by the first slave, with a second slave via the serial communication bus and providing, by the first salve to the master, an interrupt request in accordance with the serial communication protocol and a request for the direct communication between the first slave and the second slave, on the serial communication bus. The request for the direct communication is different from the at least one master-slave address.

Another method for operating direct communication over a serial communication bus, in accordance with at least one embodiment, includes communicating, by a host controller, with a first slave and with a second slave via a serial communication bus using at least one master-slave address, in accordance with a serial communication protocol. The host controller includes a master-slave module and an always-on module. The method further includes entering, by the master-slave module while the master-slave module is in the low-power mode, into a low-power mode and entering into a direct communication, by the first slave and the second slave. The method further includes clocking, by the always-on module, the serial communication bus for the direct communication.

Another method for operating direct communication over a serial communication bus, in accordance with at least one embodiment, includes communicating, by a host controller, with a first slave and with a second slave via a serial communication bus, in accordance with a serial communication protocol. The host controller includes a master-slave module and an always-on module. The method further includes entering, by the master-slave module, into a low-power mode; entering into a direct communication while the master-slave module is in the low-power mode, by the first slave and the second slave; and clocking, by the always-on module, the serial communication bus for the direct communication.

BRIEF DESCRIPTION OF THE DRAWINGS

Various aspects of apparatus and methods will now be presented in the detailed description by way of example, and not by way of limitation, with reference to the accompanying drawings, wherein.

DETAILED DESCRIPTION

Figure 1:
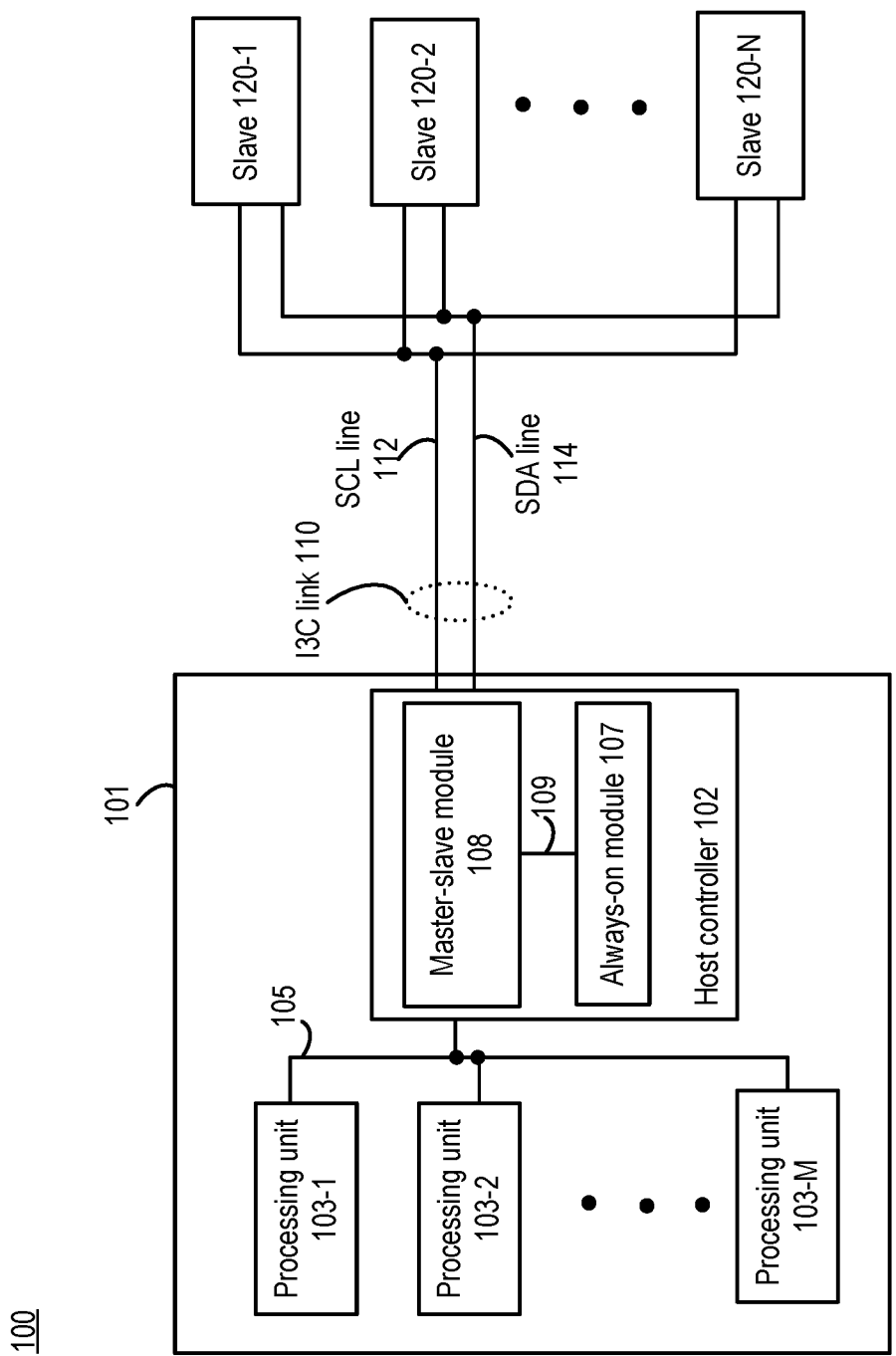
FIG. 1 illustrates components of an apparatus with serial communication, in accordance with certain aspects of the disclosure.

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well known structures and components are shown in block diagram form to avoid obscuring such concepts.

As used herein, the term "coupled to" in the various tenses of the verb "couple" may mean that element A is directly connected to element B or that other elements may be connected between elements A and B (i.e., that element A is indirectly connected with element B). In the case of electrical components, the term "coupled to" may also be used herein to mean that a wire, trace, or other electrically conductive material is used to electrically connect elements A and B (and any components electrically connected therebetween). In some examples, the term "coupled to" indicate having an electric current flowing between the elements A and B. In some examples, the term "electrically connected" may indicate having an electric current flowing between the elements A and B.

The terms "first," "second," "third," etc. are employed for ease of reference and may not carry substantive meanings. Likewise, names for components/modules may be adopted for ease of reference and might not limit the components/modules. For example, such non-limiting names may include "IBI handling" module, "IBI detection" module, "processing unit interrupt control" module, and/or "IBI response" module. Modules and components presented in the disclosure may be implemented in hardware, software, or a combination of hardware and software.

The term "bus system" may provide that elements coupled to the "bus system" may exchange information therebetween, directly or indirectly. In such fashion, the "bus system" may encompass multiple physical connections as well as intervening stages such as buffers, latches, registers, etc.

In the disclosure, the serial communication protocol may include, for example, an I3C specification. Examples of the I3C specification may include a MIPI Alliance I3C specification (e.g., the host controller being configured to operate the I3C link meeting all requirements of the MIPI I3C specification). In some examples, the I3C specification may include specifications from any standard-setting organization using part or all of an I3C link (e.g., an SCL line and an SDA line) and/or Common Command Codes provided by the MIPI Alliance I3C specification. A serial communication bus may be a link that operates in accordance with the serial communication protocol.

A direct communication scheme (e.g., peer-to-peer communication between slave devices) over a serial communication bus would improve performance of the system and reduce power consumption, since steps having a master device acting as an intermediary are eliminated. Methods and apparatuses in the disclosure are directed to an efficient, improved direct communication scheme. In one aspect of the disclosure, a master device may use an always-on module of handle the direct communication between slave devices. In such fashion, a master-slave module of the master device may enter into a low-power mode to conserve power. Such scheme might be particularly beneficial for use cases having long idle periods between the master device and the slave device. In this aspect, the specific scheme for the direct communication would not matter. For example, based on this aspect of the disclosure, the master device (e.g., the always-on module) and slave device may engage in a direct communication scheme specified by an I3C specification.

In another aspect of the disclosure, the direct communication may be triggered by an existing, known interrupt followed by a direct communication address. The master device would recognize the direct communication address as such and proceed with the direct communication among the slave devices. Information including the direct communication address and a predetermined, fixed number of clocks (e.g., a data length) may be stored within the master device and/or the slave devices. In some examples, the direct communication address might not be part of an I3C specification. For example, the direct communication address might be agreed upon between master device and the slave device via Private Contracts.

In such fashion, the master device may recognize the direct communication address as triggering a direct communication and provide a number of clocks (e.g., clock pulses) based on the stored information. The requesting slave device may provide a number of data based on the stored information. According, information on the data length of the direct communication needs not to be exchanged in the disclosed direct communication scheme, further improving system performance and reducing power needed for operating the direct communication.

FIG. 1 illustrates components of an apparatus 100 with serial communication, in accordance with certain aspects of the disclosure. The apparatus 100 may, for example, be one of a computing system (e.g., servers, datacenters, desktop computers, mobile computing device such as laptops, cell phones, vehicles, etc.), Internet of Things device, and virtual reality or augmented reality system. The apparatus 100 includes a master 101 (e.g., master device), a serial communication bus (e.g., I3C link 110), and a plurality of slaves 120-1 to 120-N (e.g., slave devices). The plurality of slaves 120-1 to 120-N includes a first slave 120-1 and a second slave 120-2. The master 101 may be, for example, an application processor that performs various functions (e.g., telephony, wireless data access, audio/video function, etc.) and communicates with the plurality of slaves 120-1 to 120-N via the I3C link 110. The I3C link 110 includes a Serial Clock (SCL) line 112 and a Serial Data (SDA) line 114.

The master 101 includes at least one processing unit (one or more) 103-1 to 103-M, a host controller 102, and a bus system 105. The bus system 105 may be one or more buses and may directly or indirectly connect the at least one processing unit 103-1 to 103-M to the host controller 102. In one example, the host controller 102 may be configured to communicate with the first slave 120-1 and with the second slave 120-2 via a serial communication bus (e.g., the I3C link 110) in accordance with a serial communication protocol.

The host controller 102 includes an always-on module 107, a master-slave module 108, and a bus system 109 coupling the always-on module 107 and the master-slave module 108. The master-slave module 108 may be configured to operate communications (of the master 101) with the first slave 120-1 and (of the master 101) with the second slave 120-2 via a serial communication bus (e.g., the I3C link 110) in accordance with the serial communication protocol (e.g., an I3C specification), using at least one master-slave address. For example, the master-slave module 108 may be configured service a slave-to-master in-band interrupt (IBI) request. The master-slave module 108 may recognize the IBI request and wake up the at least one processing unit 103-1 to 103-M accordingly. The master-slave module 108 may further the configured to control reading and writing (e.g., data exchanges) between the master 101 and the first slave 120-1 and between the master 101 and the second slave 120-2, using the at least one master-slave address.

The at least one master-slave address may be part of a serial communication protocol. For example, the at least one master-slave address may be part of an I3C specification for communications between a master and a slave. Such communication may include an exchange of data and/or an interrupt request/handling between the master (e.g., the master 101 of FIG. 1) and the slave (e.g., one of the plurality of slaves 120-1 to 120-N of FIG. 1). For example, the I3C specification provides that such master-slave address may be a Static Address for legacy I2C device or a dynamically assigned Dynamic Address, for the master or the slave.

Moreover, the master-slave module 108 may be further configured to be in a low-power mode (e.g., sleep or power-down mode) while the first slave 120-1 and the second slave 120-2 are in a direct communication. For example, the first slave 120-1 and the second slave 120-2 may be in direct communication by outputting and receiving data on a serial communication bus (e.g., the I3C link 110), without having to receive the data from the master 101.

The an always-on module 107 may be configured to stay powered-on while the master-slave module 108 is in the low-power mode. In some examples, the always-on module 107 may be designed for the dedicated functions presented herein and therefore, may be small in size and efficient in power consumption. The term "always-on" may refer to that the module remains powered-on (e.g., having power supplied thereto and receiving power) while the master-slave module 108 is in the low-power mode. The always-on module 107 may be configured to detect the direct communication between the first slave 120-1 and the second slave 120-2 and/or to facilitate the direct communication, while the master-slave module 108 is in the low-power mode. In such fashion, the master-slave module 108 needs not exit the low-power mode for the direct communication, and power consumption may be reduced. In some examples, the functions of the always-on module 107 and the master-slave module 108 may not be exclusive. For example, some functions of the always-on module 107 may be duplicated in the master-slave module 108 (but powered down in the low-power mode). Further details on the always-on module 107 is presented with FIG. 2.

The at least one processing unit 103-1 to 103-M may be, for example, central processing units (CPUs). In some examples, the at least one processing unit 103-1 to 103-M may be functional unit or units for performing various functions (e.g., telephony, wireless data access, audio/video function, etc.). For example, in a mobile device, the at least one processing unit 103-1 to 103-M may include a modem, an image signal processor, and/or multimedia modules. The plurality of slaves 120-1 to 120-N may be, for example, various sensors. For example, the plurality of slaves 120-1 to 120-N may include a fingerprint sensor, a capacitive touch sensor, gyroscope, accelerometer, magnetometer and/or a camera, etc.

A further example of the host controller 102 communicating with the first slave 120-1 in accordance with a serial communication protocol (e.g., an I3C specification) is presented infra. In one example, the master-slave module 108 may be in the low-power mode and may be powered down. The always-on module 107 may remain powered-on. The first slave 120-1 may issue an IBI request on a serial communication link (e.g., the I3C link 110) by pulling the SDA line 114 line Low or logic 0. The host controller 102 may, via the always-on module 107, detect the IBI request on the SDA line 114 and respond to the IBI request. For example, the host controller 102 may respond to the detected IBI request by clocking the SCL line 112 to receive information of the IBI request from the requesting first slave

120-1. The information of the IBI request may indicate to which of the at least one processing unit 103-1 to 103-M the IBI request is directed.

The host controller 102 (e.g., the always-on module 107) may service the IBI request by waking up the master-slave module 108, via the bus system 109. The master-slave module 108 may determine from the information of the IBI request to which of the at least one processing unit 103-1 to 103-M the IBI request is directed and wake up the at least one processing unit 103-1 to 103-M, via the bus system 105. However, in a case of a direct communication between the first slave 120-1 and the second slave 120-2, the host controller 102 (e.g., the always-on module 107) may not need service the IBI request (e.g., need to wake up the master-slave module 108). In such fashion, the master-slave module 108 may remain in the low-power mode, and power consumption is reduced.

Figure 2:
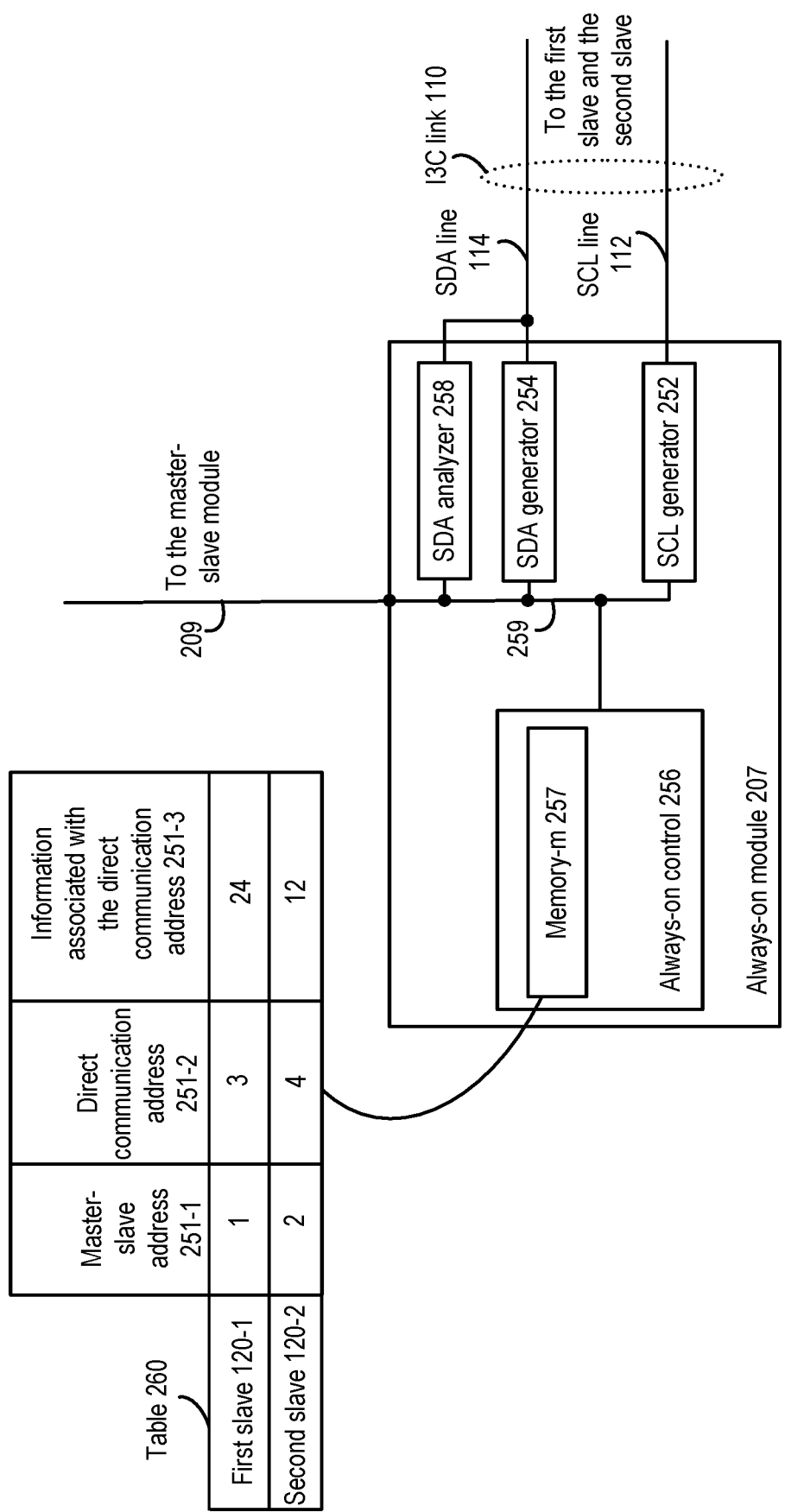
FIG. 2 illustrates an always-on module of the host controller of FIG. 1, in accordance with certain aspects of the disclosure.

FIG. 2 illustrates an always-on module 207 of the host controller of FIG. 1, in accordance with certain aspects of the disclosure. FIG. 2 includes the always-on module 207 coupled to a bus system 209 and the I3C link 110 of FIG. 1 (e.g., an instance of a serial communication bus). The bus system 209 may be an instance of the bus system 109 of FIG. 1.

In some examples, all operations of the always-on module 207 presented herein may be performed while the master-slave module 108 is in a low-power mode. The always-on module 207 may include some or all of an SDA generator 254, an SDA generator 254, an always-on control 256, a bus system 259, and/or an SDA analyzer 258. The bus system 259 couples an always-on control 256, the SDA generator 254, the always-on control 256, and the SDA analyzer 258. The SCL generator 252 may be configured to operate (e.g., to drive or to leave open) the SCL line 112. The SDA generator 254 may be configured to operate (e.g., to drive or to leave open) the SDA line 114. The SDA analyzer 258 may be configured to determine states on the SDA line 114 and/or to detect an IBI request on the serial communication bus (e.g., the I3C link 110). The always-on control 256 may be configured to control operations of the SDA analyzer 338, the SCL generator 252, and/or the SDA generator 254 to, for example, detect and respond to the IBI request detected on the serial communication bus (e.g., the I3C link 110), in accordance with a serial communication protocol (e.g., an I3C specification).

The always-on control 256 may be further configured to service the IBI request detected (e.g., to complete the IBI request; e.g., waking up the master-slave module 108 of FIG. 1, via the bus system 259 and the bus system 209). Further, the always-on control 256 may be configured to control operations of the SDA analyzer 338, the SCL generator 252, and/or the SDA generator 254 to, for example, detect a direct communication request and to facilitate a direct communication between the first slave 120-1 and the second slave 120-2 (FIG. 1).

The always-on control 256 may further include a memory-m 257. The memory-m 257 may be a volatile memory or a non-volatile memory, among others. The memory-m 257 may be configured to store, as a Table 260, at least one master-slave address 251-1, at least one direct communication address 251-2, and/or information associated with the at least one direct communication address 251-3. The at least one master-slave address 251-1 may be part of a serial communication protocol. For example, the at least one master-slave address 251-1 may be part of an I3C specification for communication between a master and a slave. Such communications may include data changes and/or an interrupt request/handling between the master (e.g., the master 101 of FIG. 1) and the slave (e.g., one of the plurality of slaves 120-1 to 120-N of FIG. 1). For example, the I3C specification provides that such master-slave address may be a Static Address for legacy I2C device or a dynamically assigned Dynamic Address, for the master or the slave.

The at least one direct communication address 251-2 may indicate an address of a target slave of the direct communication. In some examples, the at least one master-slave address 251-1 is different from the at least one direct communication address 251-2. For example, the at least one master-slave address 251-1 and the at least one direct communication address 251-2 are mutually exclusive. In some examples, the at least one direct communication address 251-2 might not be part of a serial communication protocol such as the I3C specification. In such fashion, a detection of the at least one direct communication address 251-2 would indicate a direct communication request.

The information associated with the at least one direct communication address 251-3 may include information for the always-on control 256 to facilitate the direct communication between slaves (e.g., the plurality of slaves 120-1 to 120-N of FIG. 1). For example, the information associated with the at least one direct communication address 251-3 may include a predetermined data length (and therefore, of a predetermined number of clocks) associated with each of the at least one direct communication address 251-3. In some example, being predetermined refers to that the number was determined before the direct communication request was initiated. The at least one direct communication address 251-2 and the information associated with the at least one direct communication address 251-3 may be entered by software or by private agreements between the master 101 and the plurality of slaves 120-1 to 120-N prior to the request for the direct communication.

Figure 3:
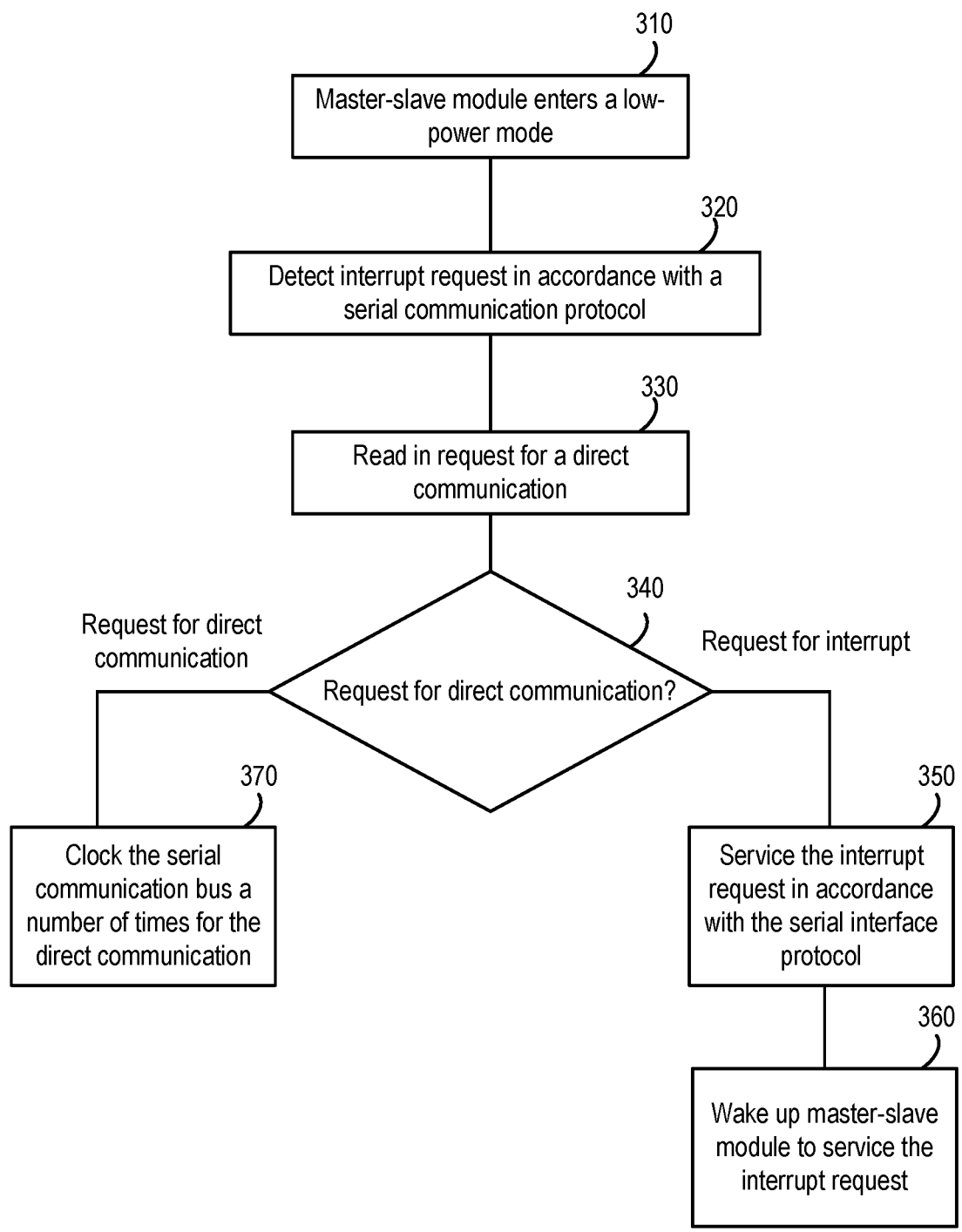
FIG. 3 illustrates operations of the host controller (the always-on module) of FIGS. 1 and 2, in accordance with certain aspects of the disclosure.

FIG. 3 illustrates operations of the host controller (the always-on module 207) of FIGS. 1 and 2, in accordance with certain aspects of the disclosure. Referring to FIG. 1, the apparatus 100 is configured for a direct communication among the plurality of slaves 120-1 to 120-N, via a serial communication bus. The direct communication may include data exchanges among the plurality of slaves 120-1 to 120-N, without the master 101 receiving and/or outputting the data. For example, a first slave 120-1 may request a direct communication with a second slave 120-2, and output data onto the serial communication bus (e.g., the I3C link 110). The destination second slave 120-2 may receive the data outputted by the first slave 120-1 from the serial communication bus directly, the data not being received or outputted by the master 101.

At 310, the master-slave module 108 of FIG. 1 enters into a low-power mode (e.g., sleep mode; power down) to save power. The always-on module 207 of FIG. 2 remains powered on and in operation. The subsequent operations 320, 330, 340, and 370 may all be performed while the master-slave module 108 is at the low-power mode. At 320, the host controller, via the always-on module 207 (see FIG. 2), detects an interrupt request in accordance with a serial communication protocol (while the master-slave module 108 of FIG. 1 is in the low-power mode). The interrupt request may be, for example, an in-band interrupt (IBI) request in accordance with the serial communication protocol. The serial communication protocol may be an I3C specification or other specifications incorporating the I3C specification. The host controller (e.g., the always-on module 207) may be configured to detect the interrupt request in accordance with a serial communication protocol and the request for the direct communication between the first slave 120-1 and the second slave 120-2, on the serial communication bus (e.g., the I3C link 110 having the SCL line 112 and the SDA line 114; see FIG. 1)(while the master-slave module 108 of FIG. 1 is in the low-power mode). Referring to FIG. 2, for example, the SDA analyzer 258 may detect the IBI request on the SDA line 114 by detecting the SDA line 114 transitioning from a High (e.g., logic 1) to a Low (e.g., a logic 0), in accordance with an I3C specification. The SDA analyzer 258 may issue an IBI request detect onto the bus system 259 to notify the always-on control 256.

At 330, the host controller, via the always-on module 207, reads in the request for the direct communication (while the master-slave module 108 of FIG. 1 is in the low-power mode). For example, in response to the IBI request detect (provided on the bus system 259), the always-on control 256 may direct, via the bus system 259, the SCL generator 252 to clock the SCL line 112 nine times to read in the information following the IBI request accordance with the I3C specification for handling the IBI request. For example, in the case of an IBI request in according to the I3C specification, the nine clock pulses may include 7 clocks to read in a Device Address (7 bits), one clock to read in an RnW bit, and one clock for the ACK (acknowledge) bit. The always-on control 256 may be configured to direct, via the bus system 259, the SDA generator 254 to provide the ACK bit onto the serial communication bus. According to the I3C specification, the 7-bit Device Address is an address of a slave (e.g., one of the plurality of slaves 120-1 to 120-N) requesting the IBI. The 7-bit Device Address is an example of a master-slave address, as the Device Address would be used for master-slave communication (e.g., the IBI request, read/write between the master 101 and the plurality of slaves 120-1 to 120-N). According to the I3C specification, the Device Address may be a Static Address for legacy I2C device or may be a dynamically assigned Dynamic Address for I3C.

In a case of a direct communication request, the information read in by the host controller, via the always-on module 207, may be a request for the direct communication. For example, in response to detecting the interrupt request (e.g., the IBI request), the host controller (e.g., the always-on module 207) may be configured to read in the request for the direct communication in response to detecting the interrupt request, in accordance of with the serial communication protocol for the interrupt request. The request for the direct communication may be an address or a code indicating a direct communication request.

In the example, the serial communication bus includes an I3C link 110 (which includes the SCL line 112 and the SDA line 114; see FIG. 1). The serial communication protocol includes an I3C protocol. The interrupt request includes an in-band interrupt (IBI) request. In some examples, the always-on module 107 may be configured to read in a Mandatory Data Byte (MDB) in accordance with an I3C specification for the IBI request. The MDB may include a device-to-device Common Command Code (CCC) that indicates a request for the direct communication.

In some examples, a different direct communication scheme is provided. The host controller (e.g., the always-on module 207) is configured to clock the I3C link 110 nine times to read in the request for the direct communication in response to detecting the interrupt request and immediately following the interrupt request (while the master-slave module 108 of FIG. 1 is in the low-power mode). The request for the direct communication includes the at least one direct communication address 251-2 (e.g., the address of the destination second slave), which is 7 bits.

In a case of the first slave 120-1 requesting the direct communication with the second slave 120-N, the request for the direct communication (e.g., the 7-bit read in following the IBI request read in by the always-on module 207) might not be part of the serial communication protocol. For example, the first slave 120-1 may provide on the serial communication bus a direct communication address of the destination second slave 120-2 as the request for the direct communication (instead IBI request information as provided by the I3C specification), following the IBI request. The direct communication address might not be part of the I3C specification. For example, the direct communication address is not part of the master-slave address (e.g., the Static Address or the Dynamic Address) specified by the I3C specification. In other words, the direct communication address is not part of the serial communication protocol.

From the perspective of the first slave 120-1, to request the direct communication with another slave, the requesting first slave 120-1 may be configured to provide, to the master 101, an interrupt request (e.g., an IBI request) in accordance with the serial communication protocol (e.g., an I3C specification) and a request for a direct communication between the first slave 120-1 and the second slave 120-2, on the serial communication bus. In some examples, the host controller 102 (e.g., the always-on module 207) may be configured to detect the interrupt request in accordance with the serial communication protocol and the request for a direct communication between the first slave 120-1 and the second slave 120-2, on the serial communication bus (while the master-slave module 108 of FIG. 1 is in the low-power mode).

In some examples, the request for the direct communication may be different from (e.g., does not include) the at least one master-slave address. The request for the direct communication may include an address of the second slave 120-2 and not an address of the first slave 120-1, in a case the first slave 120-1 is requesting the direct communication to the second slave 120-2. In some examples, the request for the direct communication is not part of the serial communication protocol (e.g., not part of an I3C specification). For example, the address of the second slave 120-2 provided by the requesting first slave 120-1 might not be specified by the serial communication protocol.

At 340, the host controller, via the always-on module 207, detects the request for the direct communication (while the master-slave module 108 of FIG. 1 is in the low-power mode). To determine whether the interrupt request is for a direct communication among the plurality of slaves 120-1 to 120-N (see FIG. 1), in some examples, the host controller (e.g., the always-on module 107 of FIG. 1) may be configured to detect the device-to-device CCC in the MDB of the IBI request, the device-to-device CCC indicating a direct communication request.

In some examples, the host controller (e.g., the always-on module 207) may be configured to store at least one direct communication address 251-2 and to determine whether the request for the direct communication indicates (e.g., includes or expresses in certain ways) the at least one direct communication address 251-2. For example, the memory-m 257 may be configured to store Table 260, including at least one master-slave address 251-1, at least one direct communication address 251-2, and information associated with the at least one direct communication address 251-3. The Table 260 may store, for each of the first slave 120-1 and the second slave 120-2, a corresponding at least one master-slave address 251-1, an at least one direct communication address 251-2, and a number of clocks associated with the direct communication address (i.e., the information associated with the at least one direct communication address 251-3).

As illustrated in FIG. 2, the master-slave address for the first slave 120-1 is one; the master-slave address for the second slave 120-2 is two; the direct communication address for the first slave 120-1 is three; and the direct communication address for the second slave 120-2 is four. In some examples, the first slave 120-1 provides onto the serial communication bus the identification including an address of the second slave 120-2 and not an address of the first slave 120-1, in a case the first slave 120-1 is requesting the direct communication to the second slave 120-2. For example, the request for the direct communication may include the address of the destination second slave 120-2 (address is four in the example) only and excludes the address of the requesting first slave 120-1 (address is three in the example). The at least one direct communication address 251-2 includes the (direct communication) address of the second slave 120-2 (four in the example).

In some examples, the host controller (e.g., the always-on control 256) may be configured to match the request for the direct communication (e.g., the address four of the destination second slave 120-2) with the Table 260 to determine whether the request (for the direct communication) indicates the at least one direct communication address 251-2. Since the address of the destination second slave 120-2 (address is four in the example) matches the at least one direct communication address 251-2, the always-on control 256 may recognize that the request having the address of four is a request for direct communication and the destination of the direct communication is the second slave 120-2. By using the address of the destination slave for direct communication request (and/or that the address is not part of the direct communication protocol), no additional transaction to provide the destination address are needed, and the cost in terms of power and time to request the direct communication among the plurality of slaves 120-1 to 120-N is reduced.

In some examples, the host controller (e.g., the always-on control 256) may be configured to determine whether the request for the direct communication is part of the serial communication protocol, based on the information stored in the memory-m 257. For example, the always-on control 256 may match the request (e.g., the address four of the destination second slave 120-2) with the at least one master-slave address 251-1 or the at least one direct communication address 251-2. For example, the request for the direct communication (e.g., the address four of the destination second slave 120-2) might not indicate the at least one master-slave address 251-1 (the at least one master-slave address 251-1 being part of the I3C specification). Such case may indicate to the always-on control 256 that request is a direct communication request. In a case that the request (e.g., the address four of the destination second slave 120-2) matches the at least one direct communication address 251-2, the always-on control 256 may likewise recognize the identification is a direct communication request.

At 350, the host controller services the interrupt request in accordance with the serial interface protocol. At 360, the host controller wakes up the master-slave module 108 (see FIG. 1) to service the interrupt request. In a case that the interrupt request is part of the serial communication protocol (e.g., the request for the direct communication matches the at least one master-slave address 251-1 or does not match the at least one direct communication address 251-2), the host controller may service the interrupt request (e.g., an IBI request in accordance with the I3C specification). Referring to FIG. 1, the always-on module 107 may be configured to wake up the master-slave module 108 from the low-power mode via the bus system 109. The always-on module 107 may be further configured to provide the read-in information (e.g., IBI information in this case) to the master-slave module 108 via the bus system 109.

The master-slave module 108 may be configured to service the IBI request in accordance with IBI-handling procedures of the I3C specification. For example, the master-slave module 108 may be configured to wake up one of the at least one processing unit 103-1 to 103-M based on the IBI information, the one of the at least one processing unit 103-1 to 103-M being a target of the IBI request.

At 370, the host controller, via the always-on module 207, clocks the communication bus a number of times for the direct communication (while the master-slave module 108 of FIG. 1 is in the low-power mode). The host controller (e.g., the always-on control 256 of the always-on module 207) may be further configured to bypass servicing the interrupt request in accordance with the serial communication protocol, in response to the request for the direct communication indicating the at least one direct communication address 251-2. For example, host controller, via the always-on control 256, may be configured to bypass servicing the IBI request in accordance of an I3C specification, in response to the request direct communication indicating the at least one direct communication address 251-2 (e.g., matching the at least one direct communication address 251-2). In some examples, the host controller (e.g., the always-on control 256) may be configured to bypass service the interrupt request (the interrupt request being in accordance with the serial communication protocol) in response to the identification being not part of the serial communication protocol (e.g., the identification does not match the at least one master-slave address 251-1).

Further, the host controller (e.g., always-on control 256 of the always-on module 207) may be configured to store information associated with the at least one direct communication address 251-3 and to clock the serial communication bus a number of times based on the information associated with the at least one direct communication address 251-3 for the direct communication (while the master-slave module 108 of FIG. 1 is in the low-power mode). Referring to FIG. 2, the memory-m 257 is configured to store the information associated with the at least one direct communication address 251-3 in the form of the number of clocks. For example, each of the number of clocks is associated with a corresponding at least one direct communication address 251-2. In such fashion, a data length of a direct communication to each of the slaves is stored in the form of number of clocks. In a case of a direct communication to the second slave 120-2, the number of clocks is twelve in FIG. 3. Thus, in this example, the always-on control 256 may be configured to instruct the SCL generator 252 to clock the SCL line 112 twelve times for the first slave 120-1 to provide data directly to the second slave 120-2 on the SDA line 114 (while the master-slave module 108 of FIG. 1 is in the low-power mode). In such fashion, the number of times to clock the serial communication bus for the direct communication may be predetermined (e.g., determined before the request for the direct communication).

Figure 4:
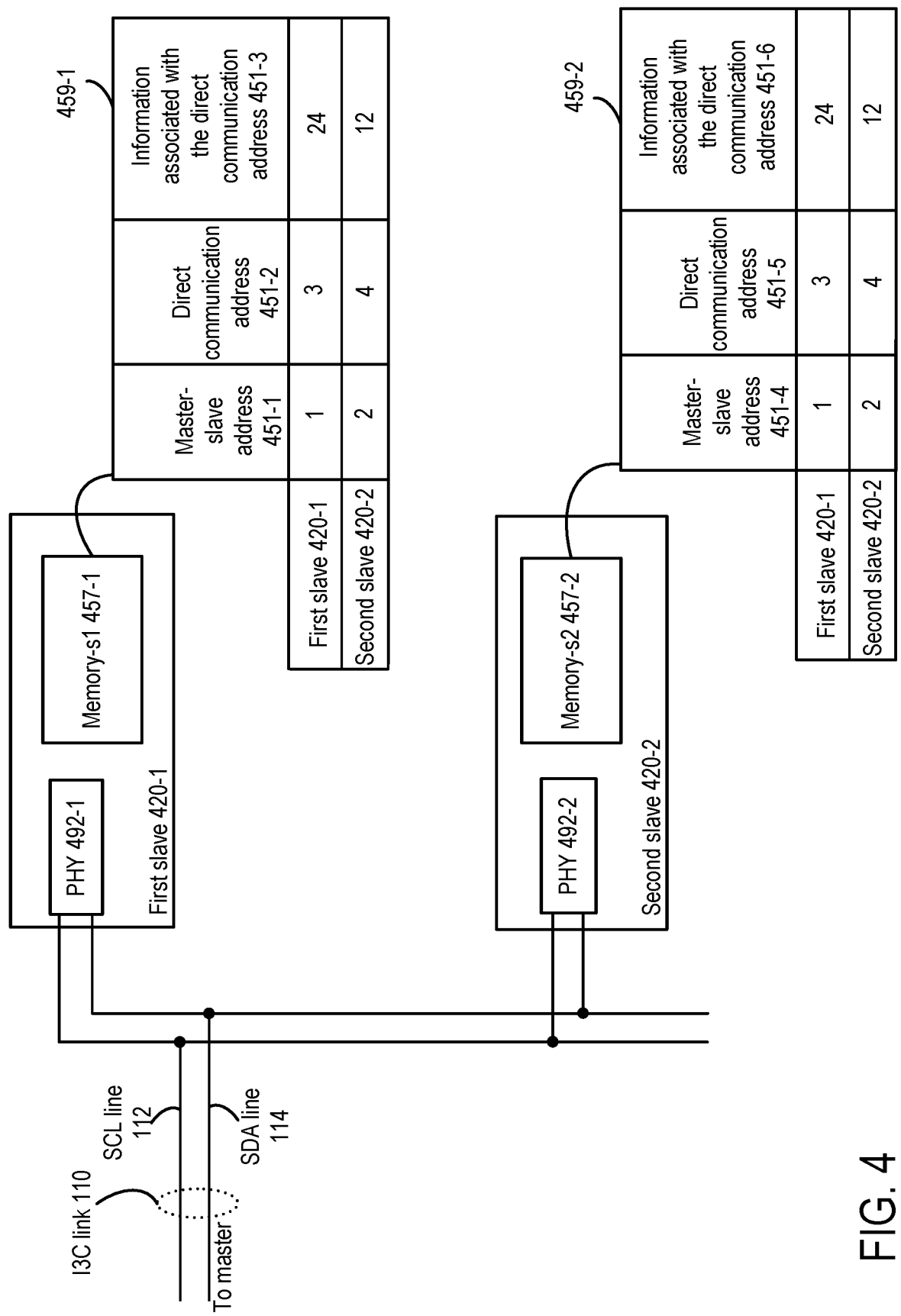
FIG. 4 illustrates a first slave and a second slave of the apparatus of FIG. 1 configured for direct communication, in accordance with certain aspects of the disclosure.

FIG. 4 illustrates a first slave 420-1 and a second slave 420-2 of the apparatus of FIG. 1 configured for direct communication, in accordance with certain aspects of the disclosure. FIG. 4 includes the first slave (e.g., a slave device) 420-1 and the second slave 420-2. The first slave 420-1 and the second slave 420-2 are coupled to a serial communication bus (e.g., the I3C link 110 including the SCL line 112 and the SDA line 114 of FIG. 1) and coupled via the serial communication bus to a master. The first slave 420-1 may be an instance of the first slave 120-1 of FIG. 1. The second slave 420-2 may be an instance of the second slave 120-2 of FIG. 1.

The first slave 420-1 may be configured to communicate with the master (e.g., the master 101 of FIG. 1) via the serial communication bus (e.g., the I3C link 110 having the SCL line 112 and the SDA line 114) using at least one master-slave address, in accordance with a serial communication protocol (e.g., an I3C specification). The first slave 420-1 may be further configured to be in a direct communication with a second slave (e.g., the second slave 420-2) via the serial communication bus. The first slave 420-1 may include some or all of a PHY 492-1 and a memory memory-s1 457-1. The PHY 492-1 may be configured to operate and/or to detect states on the serial communication bus (e.g., the I3C link 110 having the SCL line 112 and the SDA line 114).

The memory-s1 457-1 may be a volatile memory or non-volatile memory. The memory-s1 457-1 may store information of a direct communication between the first slave 420-1 and the second slave 420-2. For example, the memory-s1 457-1 may store a Table 459-1 including at least one master-slave address 451-1, at least one direct communication address 451-2, and/or information associated with the at least one direct communication address 451-3 (e.g. a number of clocks or data length).

The at least one master-slave address 451-1 may be part of the serial communication protocol, such as an I3C specification. For example, an I3C specification may provide at least one Static Address for legacy I2C support and dynamic assigned at least one Dynamic Address as the at least one master-slave address 451-1. The at least one master-slave address 451-1 may be used for communications between the master (e.g., the master 101 of FIG. 1) and one among the plurality of slaves (e.g., the first slave 420-1 or the second slave 420-2), in accordance with the I3C specification.

The at least one direct communication address 451-2 may be used to indicate a direct communication request. In some examples, the at least one direct communication address 452-2 might not be part of the serial communication protocol. For example, the at least one master-slave address 451-1 and the at least one direct communication address 452-2 may be different (e.g., mutually exclusive). In some examples, the at least one direct communication address may include an address of a source slave and/or an address of a destination slave for the direct communication. In some examples, the at least one direct communication address may exclude the address of a source slave.

The second slave 420-2 includes some or all of a PHY 492-2 and a memory memory-s2 457-2. The PHY 492-2 may be configured to operate and/or to detect states on the serial communication bus (e.g., the I3C link 110 having the SCL line 112 and the SDA line 114). The memory-s2 457-2 may be a volatile memory or non-volatile memory. The memory-s2 457-2 may store information of a direct communication between the first slave 420-1 and the second slave 420-2. For example, in similar fashion as the Table 459-1, the memory-s2 457-2 may store a Table 459-2 including at least one master-slave address 451-4, at least one direct communication address 451-5, and/or information associated with the at least one direct communication address 451-4 (e.g. a number of clocks or data length).

The first slave 420-1 and the second slave 420-2 may be further configured for a direct communication therebetween. The direct communication may include, for example, the first slave 420-1 transmit data directly to the second slave 420-2 via the serial communication bus. The master 101 (see FIG. 1) might not receive the data from the first slave 420-1 and then provide the data to the second slave 420-2.

To facilitate the direct communication, the first slave 420-1 may be configured to provide, to the master 101, an interrupt request (e.g., an in-band interrupt or IBI request) in accordance with the serial communication protocol (e.g., an I3C specification). The interrupt request may trigger at the master 101 an inquiry for the direct communication. The first slave 420-1 may be further configured to provide, to the master 101, a request for a direct communication between the first slave 420-1 and the second slave 420-2, on the serial communication bus (e.g., the I3C link 110). The request for the direct communication may be different from the at least one master-slave address of the serial communication protocol (e.g., an I3C specification).

For example, the request for the direct communication may indicate (e.g., include or express in certain ways) the at least one direct communication address 451-2. The at least one direct communication address 451-2 may be different (e.g., mutually exclusive) with all of the master-slave addresses of the serial communication protocol (e.g., an I3C specification). For example, the at least one master-slave address may include Dynamic Addresses provided by an I3C specification (and used for communication between a master and a slave), and the request for the direct communication does not include any of the at least one master-slave address. In such fashion, the request for the direct communication (e.g., the at least one direct communication address 451-2) is not part of the serial communication protocol.

Figure 5:
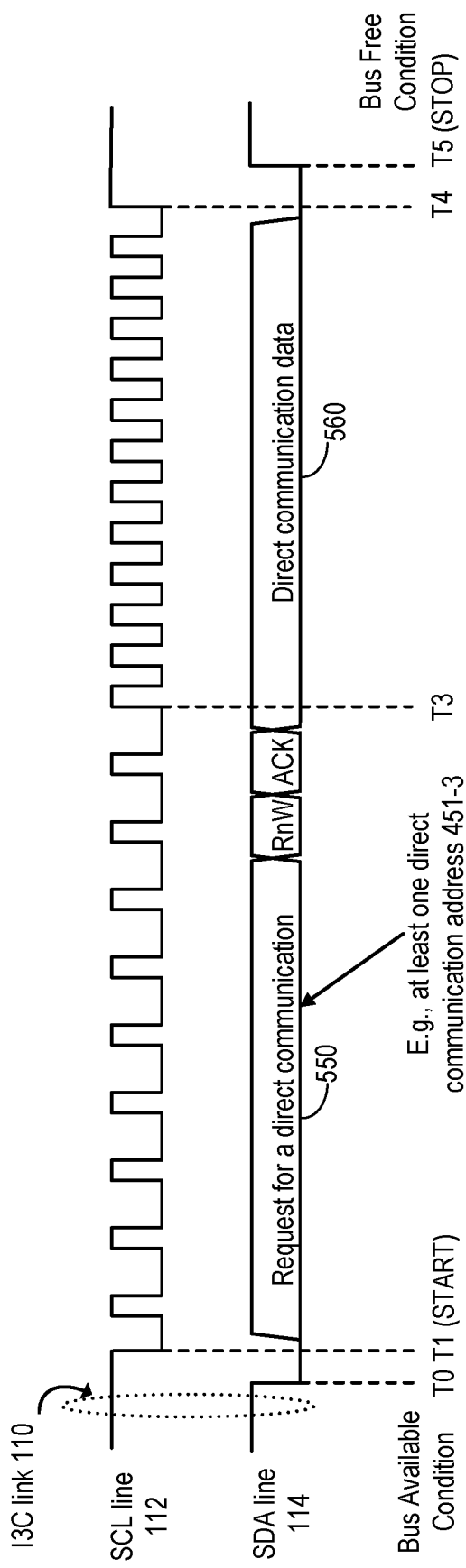
FIG. 5 illustrates direct communication waveforms on a serial communication bus, in accordance with certain aspects of the disclosure.

FIG. 5 illustrates direct communication waveforms on a serial communication bus, in accordance with certain aspects of the disclosure. Initially (before T0), the I3C link 110 is in a Bus Available State (e.g., both the SCL line 112 and the SDA line 114 are High). For example, the at least one processing unit 103-1 to 103-M and/or the master-slave module 108 (see FIG. 1) may be in the low-power mode. The master 101 may stay in the low-power mode in such fashion through the direct communication cycles without having to wake up. For example, the master 101 (see FIG. 1) may be in the low-power mode from before T0 to after T5.

At T0, the first slave 420-1 (see FIG. 4) signals an interrupt request (e.g., an IBI request) to the master 101 on the I3C link 110. The first slave 420-1 may be configured to provide the interrupt request on the serial communication bus by directing the PHY 492-1 (see FIG. 4) to pull the SDA line 114 Low. The master 101, via the host controller (e.g., the SDA analyzer 258 of the always-on module 207; see FIG. 2) may detect that the SDA line 114 is pulled Low and recognize the interrupt request. The SDA analyzer 258 may issue an IBI detect signal to the always-on control 256, via the bus system 259 (see FIG. 2).

At T1, the master 101 (via the always-on module 207 of the host controller) reads in a request for a direct communication 550 in response to detecting the interrupt request, in accordance with the serial communication protocol for the interrupt request. For example, in response to receiving the IBI detect signal from the SDA analyzer 258, the always-on control 256 may be configured to direct the SCL generator 252 to pull the SCL line 112 Low to complete a START Condition.

The always-on module 207 of the host controller may be configured to read in information immediately following (e.g., no intervening data exchanges on the SDA line 114) the interrupt request. In a case of a slave requesting an IBI request, the information read in would include a master-slave address (e.g., a Dynamic Address) of the requesting slave, in accordance with the I3C specification for the IBI request. In a case of a slave requesting a direct communication, the information read in immediately following detecting the IBI request would be the request for the direct communication 550.

The always-on control 256 may be configured to direct the SCL generator 252 to clock the SCL line 112 nine times to read in the IBI request information or the request for the direct communication 550, in response to detecting the interrupt request (immediately following the interrupt request). The nine clocks account for 7 bits of the request for the direct communication 550 (e.g., the at least one direct communication address 451-2 of FIG. 4), one bit for RnW (read or write), and one bit for ACK to signal acceptance of the direct communication request by the host controller.

The 7-bit request for the direct communication 550 may indicate (e.g., include or express in certain ways) at least one direct communication address 451-2. The first slave 420-1 may be configured to read from the memory-s1 457-1 information of the direct communication (e.g., the Table 459-1). For example, the memory-s1 457-1 may be configured to store at least one direct-communication address 451-2. The at least one direct communication address 451-2 may be used to indicate to the master 101 a direct communication request. In some examples, the at least one direct communication address 451-1 might not be part of the serial communication protocol (e.g., not part of an I3C specification).

For example, the first slave 420-1 requesting the direct communication to the second slave 420-2 may be configured to provide the request for the direct communication 550 immediately following (e.g., no intervening data exchanges on the SDA line 114) the interrupt request at T0. The requesting first slave 420-1 may be configured to, based on the memory-s1 457-1, provide the at least one direct communication address 451-2 of the destination second slave 420-2 (in the example of FIG. 4, the address is four). The first slave 420-1 may be configured to provide, via the PHY 492-1, the address four onto the I3C link 110 as the request for the direct communication 550.

Accordingly, the request for the direct communication 550 may include an address of the destination second slave 420-2 and not an address of the requesting first slave 420, the first slave 420-1 being requesting the direct communication to the second slave 420-2. For example, the master 101 does not need additional steps to acquire the address of the destination slave. In such fashion, information needed for the direct communication is reduced, and performance and power consumption are improved.

Referring to FIG. 4, the second slave 420-2 may include some or all of the PHY 492-2 and the memory-s2 457-2, similar to the first slave 420-1. The PHY 492-2 may be configured to operate and to detect states on the serial communication bus (e.g., the I3C link 110). The memory-s2 457-2 may be configured to store, as a Table 459-2, at least one master-slave address 451-4 for communication under a serial communication protocol (e.g., an I3C specification). The memory-s2 457-2 may be further configured to store, as the Table 459-2, direct communication information including at least one direct communication address 451-5 and/or information associated with the at least one direct communication address 451-6.

The second slave 420-2 may be configured to detect on the serial communication bus the request for the direct communication 550. For example, the PHY 492-2 of the second slave 420-2 may be configured to detect states on the I3C link 110 and read in the request for the direct communication 550 (e.g., the at least one direct communication address 451-2 provided by the first slave 420-1). In the example, the provided at least one direct communication address 451-2 is four.

The second slave 420-2 may be further configured to determine, based on direct communication information stored in the memory-s2 457-2 and the received request for the direct communication 550, that the second slave 420-2 is the destination device of the direct communication request. For example, the second slave 420-2 may be configured to match the request for the direct communication 550 (e.g., the at least one direct communication address 451-2) with the at least one master-slave address 451-4 stored in the memory-s2 457-2. In the example, the at least one direct communication address 451-2 is four and matches the at least one direct communication address 451-5, indicating that the second slave 420-2 is the destination device.

At T3, the master 101 (via a host controller) clocks the serial communication bus a number of times based on information associated with the at least one direct communication address for the direct communication. The master 101 contributes to the direct communication between the first slave 420-1 and the second slave 420-2 by clocking the SCL line 112 of the I3C link 110. The host controller may be configured, via the SDA analyzer 258, to read in the request for the direct communication 550. The always-on control 256 may read in the request for the direct communication 550 via the bus system 259 and determine whether the request for the direct communication 550 indicates the at least one direct communication address.

For example, based on the memory-m 257, the always-on control 256 may be configured to determine that the request for the direct communication 550 (e.g., the received at least one direct communication address 451-2 of four) is different (e.g., mutually exclusive) from the at least one master-slave address 251-1. The always-on control 256 may thus be configured to determine that the request for the direct communication 550 is not part of the serial communication protocol (e.g., an I3C specification) of which the at least one master-slave address 251-1 is a part.

In some examples, the always-on control 256 may be configured to determine that the request for the direct communication 550 indicates (e.g., includes or expresses in certain ways) the at least one direct communication address 251-2, based on the memory-m 257. In the example, the always-on control 256 may be configured to find that the received at least one direct communication address 451-2 (e.g., four) matches the at least one direct communication address 251-2 stored in the memory-m 257. In such fashion, the host controller (via the always-on control 256) may be configured to determine that the interrupt request detected at T0 is indeed a direct communication request, and not an IBI request in accordance with the I3C specification. The host controller (via the always-on control 256) may be configured to bypass servicing the IBI request in accordance with the I3C specification, in response to the request for the direct communication 550 indicating (e.g., including or expressing in certain ways) the at least one direct communication address 251-2 stored in the memory-m 257.

The host controller, via the always-on module 207, may be configured to clock the serial communication bus (e.g., the I3C link 110) a number of times based on the information associated with the at least one direct communication address 251-3, stored in the memory-m 257. In the example, the received at least one direct communication address 451-2 is four, indicating that target of the direct communication is the second slave 120-2. The always-on control 256 may be configured to determine that the corresponding information associated with the at least one direct communication address 251-3 is twelve clocks. The information associated with the at least one direct communication address 251-3 may express information in terms of the number of clocks or a data length of the direct communication, for example.

The always-on control 256 may be configured to instruct the SCL generator 252 to clock the I3C link 110 twelve times, based on the information associated with the at least one direct communication address 251-3 for the direct communication. In such fashion, the host controller (e.g. the always-on module 207) may be configured to provide a predetermined number of clocks onto the serial communication bus for the direct communication. The predetermined number of clocks may be, for example, provided onto the memory-m 257 via private agreements between the master 101 and the plurality of slaves 120-1 to 120-N (see FIG. 1) or via software before the request for the direct communication 550.

The first slave 420-1 and the second slave 420-2 may utilize the clocking provided by the master 101 for the direct communication. The first slave 420-1 may be configured to provide a number of data on the serial communication bus based on the information associated with the at least one direct communication address 453-3 stored within the first slave 420-1. In the Table 459-1, the information associated with the at least one direct communication address 453-3 corresponding to the destination second slave 420-2 is twelve. The information associated with the at least one direct communication address 453-3 may express the information in terms of a number of clocks or data length, etc. The first slave 420-1 may be configured to provide 12 bits of direct communication data 560, via the PHY 492-1, onto the I3C link.

The second slave 420-2 may be configured to receive the direct communication data 560 from the serial communication bus directly from the first slave 420-1. The direct communication data 560 are not received or provided by the master 101. The second slave 420 may be configured to determine that itself is indeed the destination of the request for the direct communication 550, based on based on the Table 459-2 stored in the memory-s2 457-2. For example, the second slave 420 may be configured to determine the request for the direct communication 550 indicates (e.g., includes or expresses in certain ways) at least one direct communication address 451-5 stored in the in the memory-s2 457-2. In the example, the received request for the direct communication 550 includes the at least one direct communication address 451-3, which is four. The second slave 420-2 may be configured to recognize that itself is the destination of the request for the direct communication 550, because the at least one direct communication address 451-5 of four is associated with the second slave 420-2 in the Table 459-2.

The second slave 420 may be further configured to determine a number of clocks or a data length associated with the at least one direct communication address 451-3 received on the serial communication bus (e.g., the I3C link 310). For example, the second slave 420 may be configured to, based on the Table 459-2 stored in the memory-s2 457-2, determine the information associated with the at least one direct communication address 451-6. In the example, the received request for the direct communication 550 includes the at least one direct communication address 451-3, which is four. The corresponding information associated with the at least one direct communication address 451-6 is twelve. Accordingly, the second slave 420 may be further configured to receive the direct communication data 560 (12 bits) based on the corresponding information associated with the at least one direct communication address 451-6.

As presented above, the master 101, the first slave 420-1, and the second slave 420-2 may be configured to engage in a direct communication (between the first slave 420-1 and the second slave 420-2). Each of the master 101, the first slave 420-1, and the second slave 420-2 may be configured to store at least one master-slave address (e.g., respectively 251-1, 452-1, 451-4) in accordance with the serial communication protocol (e.g., the I3C specification). Each of the master 101, the first slave 420-1, and the second slave 420-2 may be configured to store at least one direct communication address (e.g., respectively 251-2, 452-2, 451-5) to identify an interrupt request as a direct communication address. The at least one direct communication address (e.g., 251-2, 452-2, or 451-5) may be different (e.g., exclusive) from the at least one direct communication address (e.g., 251-2, 452-2, and 451-5) and may not be part of the serial communication protocol (e.g., not part of the I3C specification). Each of the master 101, the first slave 420-1, and the second slave 420-2 may be further configured to store information associated with the at least one direct communication address (e.g., respectively, 251-3, 451-3, 451-6). Based on the information associated with the at least one direct communication address 251-3, the master 101 (via the always-on module 207) may be configured to clock a serial communication bus a number of times, while a master-slave module 108 is in a low-power mode. Based on the information associated with the at least one direct communication address 451-3, the first slave 420-1 may be configured to provide a predetermine number of (direct communication) data on the serial communication bus. Based on the information associated with the at least one direct communication address 451-6, the second slave 420-2 may be configured to receive a predetermine number of data on the serial communication bus. Being predetermined may refer to setting the values prior to the request for the direct communication 550.

At T4, after the direct communication data 560 are transferred, the SCL line 312 is pulled High. AT T5, the SDA line 314 is pulled High to complete a STOP condition. For example, referring to FIG. 2, the always-on control 256 may direct the SCL generator 252 and/or the SDA generator 254 to pull the SCL line 112 and/or the SDA line 114 High, in a case that the direct communication is completed. Upon STOP, the I3C link 110 enters a Bus Free Condition (a predecessor of the Bus Available Condition), and the I3C link 110 is relinquished.

Figure 6:
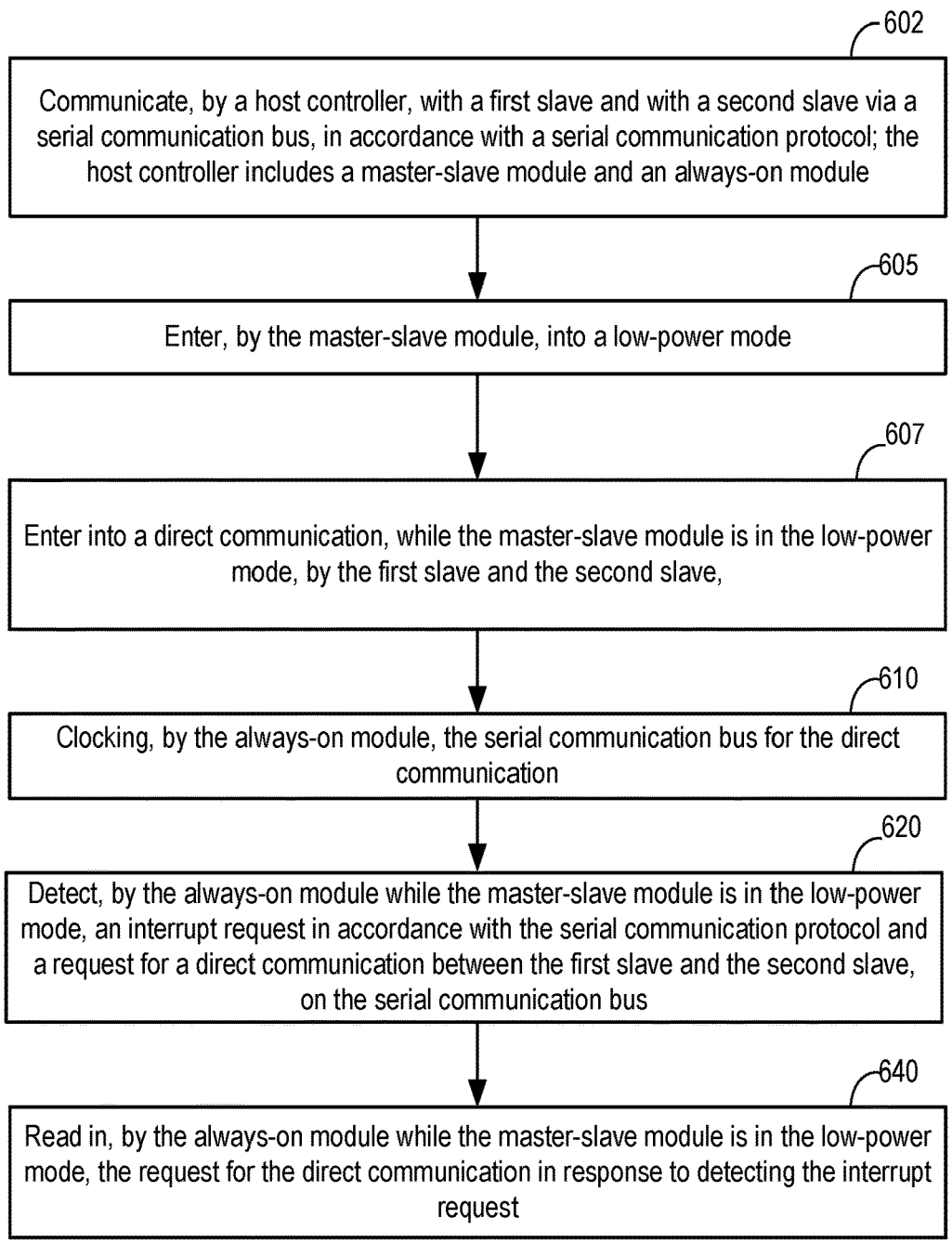
FIG. 6 illustrates a method for operating direct communication on a direct communication bus, in accordance with certain aspects of the disclosure.

FIG. 6 illustrates a method for operating direct communication on a direct communication bus, in accordance with certain aspects of the disclosure. The operations of FIG. 6 may be implemented by, for example, the apparatus/host controller/slaves presented with FIGS. 1, 2, and 4. The arrows indicate certain relationships among the operations, but not necessarily sequential relationships.

At 602, a host controller communicates with a first slave and with a second slave via a serial communication bus, in accordance with a serial communication protocol. In some examples, the host controller (e.g., the master-slave module 108) communicates with the first slave 120-1 and with the second slave 120-2 via the I3C link 110 (an instance of the serial communication bus), in accordance with an I3C specification (an instance of the serial communication protocol). Such communications may include in-band (IBI) interrupts and data exchanges between the host controller (which is part of a master, such as the master 101 of FIG. 1) and the first slave 120-1 or with the second slave 120-2, using master-slave addresses in accordance with the I3C specification. The communication may be conducted using master-slave addresses, including Static Addresses and/or Dynamic Addresses provided by the I3C specification.

For example, the master-slave module 108 may operate communications (of the master 101) with the first slave 120-1 and (of the master 101) with the second slave 120-2 via a serial communication bus (e.g., the I3C link 110) in accordance with the serial communication protocol (e.g., an I3C specification), using at least one master-slave address. For example, the master-slave module 108 may service a slave-to-master in-band interrupt (IBI) request using the master-slave address. The master-slave module 108 may recognize the IBI request and wake up the at least one processing unit 103-1 to 103-M accordingly. The master-slave module 108 may further control reading and writing (e.g., data exchanges) between the master 101 and the first slave 120-1 and between the master 101 and the second slave 120-2, using the at least one master-slave address.

At 605, a low-power mode is entered by the master-slave module. For example, the master-slave module 108 enters into a sleep mode or is powered down to reduce power consumption. At 607, a direct communication is entered by the first slave and the second slave, while the master-slave module is in the low-power. For example, referring to FIG. 1, the always-on module 107 remains powered on while the master-slave module 108 is in the low-power mode. The always-on module 107 detects and facilitates a direct communication between the first slave 120-1 and the second slave 120-2.

At 610, the serial communication bus is clocked by the always-on module for the direct communication. For example, referring to FIG. 2 and while the master-slave module 108 is in the low-power mode, the host controller (e.g., the always-on control 256) determines, based on the information associated with the at least one direct communication 251-3 and the received request for the direct communication 550 (see FIG. 5)(e.g., the information associated with the at least one direct communication 251-3 is selected based on the received request for the direct communication 550). The host controller (e.g., the always-on control 256) operates the SCL generator 252 to clock the SCL line 112 the number of times for the direct communication between the salves. In some examples, the serial communication bus is clocked a number of times by the host controller (e.g., the always-on module 107; see FIG. 1), based on the information associated with the at least one direct communication address 251-3 (see FIG. 2) for the direct communication, while the master-slave module 108 of FIG. 1 is in a low-power mode.

At 620, an interrupt request in accordance with the serial communication protocol and a request for the direct communication between the first slave and the second slave are detected by the always-on module, while the master-slave module is in the low-power mode, on the serial communication bus. In some examples, while the master-slave module 108 is in the low-power mode, the host controller (e.g., the always-on module 107 of FIG. 1) detects an IBI request in accordance of the I3C specification (an instance of an interrupt request in accordance with the serial communication protocol). The always-on module 107 of FIG. 1 further reads in, while the master-slave module 108 of FIG is in a low-power mode, an Mandator Data Byte (MDB) in response to detecting an IBI request. The always-on module 107 of FIG. 1 may recognize that the MDB includes device to device Common Command Code that indicates the direct communication request, while the master-slave module 108 is in the low-power mode.

In some examples, while the master-slave module 108 is in the low-power mode, the host controller (e.g., the always-on module 207 of FIG. 2) detects the IBI request in accordance of the I3C specification (an instance of an interrupt request in accordance with the serial communication protocol). The host controller (e.g., the always-on module 207 of FIG. 2) further detects a request for a direct communication between the first slave 120-1 and the second slave 120-2, on the I3C link 110. For example, the always-on module 207 of FIG. 2, using the SDA analyzer 258, detects the request for the direct communication 550 (see FIG. 5). In some examples, the request for the direct communication 550 may be different from the master-slave address.

At 640, the request for the direct communication is read in by always-on module while the master-slave module is in the low-power mode, in response to detecting the interrupt request. In some examples, the host controller (e.g., the always-on module 107 of FIG. 1) reads in, while the master-slave module 108 of FIG is in a low-power mode, an Mandator Data Byte in response to detecting an IBI request.

In some examples, referring to FIG. 2 and while the master-slave module 108 is in the low-power mode, the host controller (e.g., the always-on control 256) reads in the request for the direct communication 550 on the I3C link 110 (the SDA line 114), in response to the SDA analyzer 258 detecting an IBI request. Referring to FIG. 5, the host controller (e.g., the always-on control 256) detects the IBI request at T0 and in response, (immediately or without intervening operations) reads in the request for the direct communication 550 starting at T1 (while the master-slave module 108 is in a low-power mode).

Figure 7:
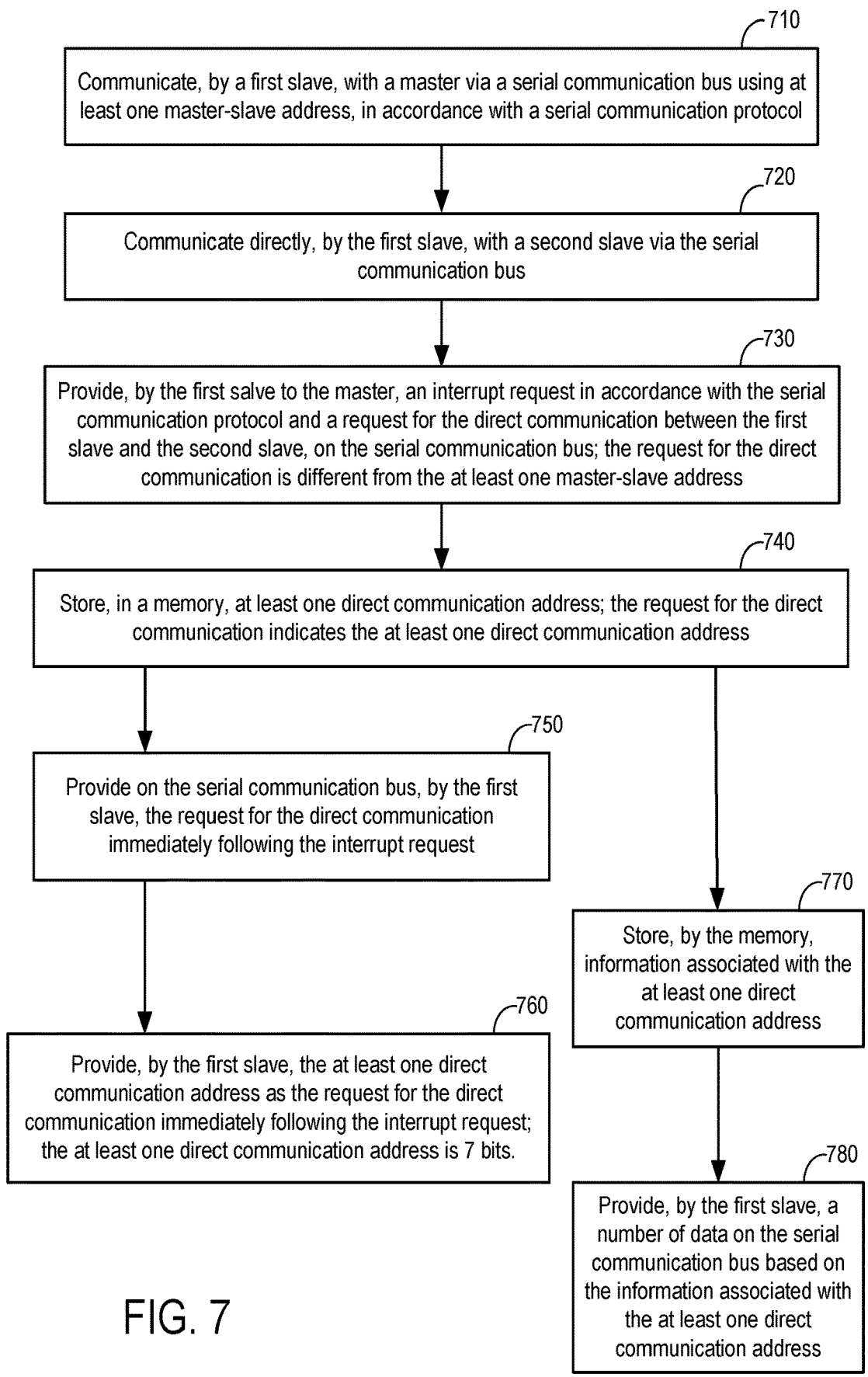
FIG. 7 illustrates another method for operating direct communication on a direct communication bus, in accordance with certain aspects of the disclosure.

FIG. 7 illustrates another method for operating direct communication on a direct communication bus, in accordance with certain aspects of the disclosure. The operations of FIG. 7 may be implemented by, for example, the apparatus/host controller/slaves presented with FIGS. 1, 2, and 4. The arrows indicate certain relationships among the operations, but not necessarily sequential relationships.

At 710, a first slave communicates with a master via a serial communication bus using at least one master-slave address, in accordance with a serial communication protocol. For example, referring to FIG. 1, the first slave 120-1 communicates with the master 101 via the I3C link 110 (an instance of the serial communication bus) using at least one master-slave address, in accordance with an I3C specification (an instance of the serial communication protocol). Such communications may include, for example, an IBI request initiated by the first slave 120-1 (and serviced by the master 101) and/or data changes therebetween. The at least one master-slave address may be, for example, Static Address and/or Dynamic Address specified by the I3C specification.

At 720, the first slave communicates directly with a second slave via the serial communication bus. For example, referring to FIG. 1, the first slave 120-1 communicates directly (e.g., in a direct communication) with a second slave 120-2. The first slave 120-1 provides direct communication data onto the serial communication bus (e.g. the I3C link 110) and received by the second slave 120-2. The directly communication data are not received and/or not provided by the master 101.

At 730, an interrupt request in accordance with the serial communication protocol and a request for the direct communication between the first slave and the second slave are provided by the first slave to the master, on the serial communication bus. The request for the direct communication is different from the at least one master-slave address. Referring to FIG. 5, at T0, the first slave 120-1 pulls the SDA line 114 Low to signal an IBI request (an instance of the interrupt request), in accordance with an I3C specification (an instance of the serial communication protocol). Referring to FIG. 4, the first slave 120-1 may, via the PHY 492-1, pulls the SDA line 114 Low.

Referring to FIG. 5, after T1, the first slave 120-1 provides onto the SDA line 114 (the I3C link 110) the 7-bit request for the direct communication 550 (for direct communication between the first slave 120-1 and the second slave 120-2). Referring to FIG. 4, the first slave 120-1 (via the PHY 492-1) provides onto the SDA line 114 at least one direct communication address 451-2 (from the memory-s1 457-1), as the request for the direct communication 550. The request for the direct communication 550 is different from the at least one master-slave address. For example, the request for the direct communication 550 is not part of the I3C specification and/or is not used in master-slave communications.

At 740, at least one direct communication address is stored in a memory. The request for the direct communication indicates the at least one direct communication address. For example, referring to FIG. 4, the first slave 120-1 includes a memory-s1 457-1. The memory-s1 457-1 stores the at least one direct communication address 451-2. The first slave 120-1, via the PHY 492-1, provides onto the I3C link 110 the at least one direct communication address 451-2 as the request for the direct communication 550. The request for the direct communication 550 thus indicates (e.g., includes or expresses in certain ways) the at least one direct communication address 451-2. In some examples, the request for the direct communication 550 includes an address of the second slave 120-2 (e.g., four in the Table 459-1) and not an address of the first slave 120-1 (e.g., not three in the Table 459-1, the first slave 120-1 being requesting the direct communication to the second slave 120-2.

At 750, the request for the direct communication is provided by the first slave on the serial communication bus immediately following the interrupt request. Referring to FIG. 5, the first slave 120-1 provides the request for the direct communication 550 on the I3C link 110 (an instance of the serial communication bus) immediately following the IBI request at T0. For example, there are no intervening data changes between the IBI request at T0 and the request for the direct communication 550.

At 760, the at least one direct communication address is provided by the first slave as the request for the direct communication immediately following the interrupt request. The at least one direct communication address is 7 bits. In some examples, the serial communication bus includes, for example, an I3C link 110. The serial communication protocol includes an I3C protocol (e.g., an I3C specification). The interrupt request includes an in-band interrupt (IBI) request (see FIG. 5 at T0). Referring to FIG. 5, the first slave 120-1 provides the at least one direct communication address 451-2 as the request for the direct communication 550 immediately following the interrupt request (e.g., the IBI request at T0). Referring to FIG. 4, the at least one direct communication address 451-1 (stored in the memory-s1 457-1) is 7 bits.

At 770, information associated with the at least one direct communication address is stored in a memory. Referring to FIG. 4, the first slave 120-1 includes a memory-s1 457-1. The memory-s1 457-1 stores the information associated with the at least one direct communication address 451-3. At 780, a number of data is provided by the first slave on the serial communication bus based on the information associated with the at least one direct communication address. Referring to FIG. 5, at T3, the first slave 120-1 provides a number of data onto the I3C link 110 based on the information associated with the at least one direct communication address 451-3. Referring to FIG. 4, the first slave 120-1 determines, from the memory-s1 457-1, the information associated with the at least one direct communication address 451-3 associated with the destination second slave 120-2 is twelve. The first slave 120-1, via the PHY 492-1, provides 12-bit direct communication data onto the I3C link 110 (see FIG. 5 at T3). The host controller (via the always-on module 207) provides the clocking on the I3C link 110.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:
1. An apparatus, comprising:
a master comprising a host controller, the host controller being configured to communicate with a first slave and with a second slave via a serial communication bus, in accordance with a serial communication protocol, the master assigning a unique dynamic slave address to each slave,
wherein the host controller comprises
a master-slave module configured to communicate with the first slave and with the second slave via the serial communication bus in accordance with the serial communication protocol and be in a low-power mode while the first slave and the second slave are in a direct communication, and
an always-on module configured to, while the master-slave module is in the low-power mode, clock the serial communication bus for the direct communication and not wake the master-slave module in a case of the direct communication,
wherein the always-on module is further configured to detect, while the master-slave module is in the low-power mode, an interrupt request and a request for the direct communication between the first slave and the second slave on the serial communication bus and to recognize the request for the direct communication based on a direct communication address that is separate and distinct from the assigned dynamic address.

2. The apparatus of claim 1, wherein the always-on module is further configured to read in, while the master-slave module is in the low-power mode, the request for the direct communication in response to detecting the interrupt request.

3. The apparatus of claim 2, wherein the serial communication bus comprises an Improved Inter Integrated Circuit (I3C) link, the serial communication protocol comprises an I3C protocol, and the interrupt request comprises an in-band interrupt (IBI) request.

4. The apparatus of claim 2, further comprising one of a computing system, an Internet of Things device, and a virtual reality or augmented reality system incorporating the serial communication bus, the first slave, and the second slave.

5. A method for operating a direction communication over a serial communication bus, comprising:
communicating, by a host controller, with a first slave and with a second slave via a serial communication bus, in accordance with a serial communication protocol, wherein the host controller comprises a master-slave module and an always-on module;
assigning, by the host controller, a unique dynamic address to each slave;
entering, by the master-slave module, into a low-power mode;
entering into a direct communication, while the master-slave module is in the low-power mode and not awaken by the always-on module, by the first slave and the second slave;
clocking, by the always-on module, the serial communication bus for the direct communication;
detecting, by the always-on module while the master-slave module is in the low-power mode, an interrupt request and a request for the direct communication between the first slave and the second slave on the serial communication bus; and
recognizing, by the always-on module, the request for the direct communication based on a direct communication address, that is separate and distinct from the assigned dynamic address.

6. The method of claim 5, further comprising:
reading in, by the always-on module while the master-slave module is in the low-power mode, the request for the direct communication in response to detecting the interrupt request.

7. The method of claim 6, wherein the serial communication bus comprises an I3C link, the serial communication protocol comprises an Improved Inter Integrated Circuit (I3C) protocol, and the interrupt request comprises an in-band interrupt (IBI) request.

8. An apparatus, comprising:
a master comprising a host controller,
the host controller being configured to communicate with a first slave and with a second slave via a serial communication bus using at least one master-slave address that is assigned by the master, in accordance with a serial communication protocol, the master-slave address being for master-slave communications,
wherein the host controller is configured to detect an interrupt request in accordance with the serial communication protocol and a request for a direct communication between the first slave and the second slave, on the serial communication bus,
wherein the request for the direct communication includes an address that is separate and distinct from the assigned master-slave address.

9. The apparatus of claim 8, wherein request for the direct communication is not part of the serial communication protocol.

10. The apparatus of claim 8, wherein the host controller is further configured to store at least one direct communication address and to determine whether the request for the direct communication indicates the at least one direct communication address.

11. The apparatus of claim 10, wherein the request for the direct communication comprises an address of the second slave and not an address of the first slave, the first slave being requesting the direct communication to the second slave.

12. The apparatus of claim 10, wherein the host controller is further configured to read in the request for the direct communication in response to detecting the interrupt request.

13. The apparatus of claim 12, wherein the host controller is further configured to bypass servicing the interrupt request in accordance with the serial communication protocol, in response to the request for the direct communication indicating the at least one direct communication address.

14. The apparatus of claim 10, wherein the host controller is further configured to store information associated with the at least one direct communication address and to clock the serial communication bus a number of times based on the information associated with the at least one direct communication address for the direct communication.

15. The apparatus of claim 14,
wherein the host controller further comprises a master-slave module and an always-on module, wherein the master-slave module is configured to operate communication with the first slave and with the second slave via the serial communication bus, in accordance with the serial communication protocol, and
the always-on module is configured to detect the interrupt request and the request for the direct communication and to clock the serial communication bus for the direct communication, while the master-slave module is in a low-power mode.

16. The apparatus of claim 14, wherein the serial communication bus comprises an Improved Inter Integrated Circuit (I3C) link, the serial communication protocol comprises an I3C protocol, and the interrupt request comprises an in-band interrupt (IBI) request, and wherein the host controller is configured to clock the I3C link 9 times to read in the request for the direct communication in response to detecting the interrupt request, immediately following the interrupt request, and wherein the at least one direct communication address is 7 bits.

17. The apparatus of claim 14, further comprising one of a computing system, an Internet of Things device, and a virtual reality or augmented reality system incorporating the serial communication bus, the first slave, and the second slave.

* * * * *